United States Patent
Floria

[15] 3,691,092
[45] Sept. 12, 1972

[54] 1,1,1,3,3,3-HEXAFLUORO-2-PROPANOL/C1 TO C4 ALKANOL COMPLEXES

[72] Inventor: Joseph Angelo Floria, Pennsville, N.J.

[73] Assignee: E. I. du Pont de Nemours and Company, Wilmington, Del.

[22] Filed: Oct. 29, 1970

[21] Appl. No.: 85,220

[52] U.S. Cl. ............252/364, 106/311, 252/171, 252/DIG. 9, 260/33.4 R
[51] Int. Cl. ...............................................B01f 1/00
[58] Field of Search......252/364, 67, 69, 171, DIG. 9

[56] References Cited

UNITED STATES PATENTS 2,999,816   9/1961   Bennett et al..........252/364 X
3,330,776   7/1967   Coe et al. ................252/364

Primary Examiner—Richard D. Lovering
Attorney—John R. Powell

[57] ABSTRACT

1,1,1,3,3,3-Hexafluoro-2-propanol forms maximum boiling point complexes with primary, secondary and tertiary $C_1$ to $C_4$ alkanols that have improved selective solubilities for polymethylmethacrylates and other similar polymers.

5 Claims, No Drawings

1,1,1,3,3,3-HEXAFLUORO-2-PROPANOL/C1 TO C4 ALKANOL COMPLEXES

BACKGROUND OF THE INVENTION

This invention relates to the field of constant boiling complexes especially useful in the selective solution of polymers.

1,1,1,3,3,3-Hexaflouro-2-propanol, sometimes called hexaflourosiopropanol and hereinafter called HFIP, is conveniently prepared by reduction of 1,1,1,3,3,3-hexaflouropropan-2-one as disclosed by Middleton et al. in J. Am. Chem. Soc. 86 4948 (1964) and by Middleton in U.S. Pat. No. 3,245,944. The above references disclose that HFIP and related highly halogenated alcohols are powerful hydrogen donor solvents. Such alcohols, in particular HFIP, are finding increasing use as solvents especially for condensation polymers many of which can be dissolved by no other solvent.

Middleton and Middleton et al. also disclose that HFIP and similar alcohols form stable distillable 1:1 molecular complexes with hydrogen bond acceptors such as tetrahydrofuran. The molecular complexes have boiling points higher than those of either component. The complex formed from HFIP and tetrahydrofuran is insoluble in and apparently stable to water.

HFIP also forms minimum boiling point azeotropes with a number of compounds which are not hydrogen bond acceptors. Technical Report DP-4A published in 1968 by E. I. du Pont de Nemours and Co. discloses such azeotropes of HFIP with benzene, 1,1,2-trichloro-1,2,2-triflouroethane, n-hexane, and methylene chloride. U.S. Pat. No. 3,284,348 to Hutton disclosed minimum boiling point azeotropes of HFIP with 2-methylpentane, n-hexane n-heptane, 1- and 2-heptene, methylcyclohexane, and benzene.

Technical Report DP-4- (cited above) also discloses the solubilities at room temperature of a number of polymers in HFIP as follows:

Solubility (g polymer/100 g. total solution)

| | |
|---|---|
| Polyamides | 25–27 |
| Polyesters | 15–20 |
| Polyacrylonitriles | 7–8 |
| Polyacetols | >5–8 |
| Polymethylmethacrylates | 25 (gel) |
| Hydrolyzed polyvinylesters | 15–20 |

The solubility in HFIP of synthetic fibers such as polyamides and polyesters has been exploited by Lautenberger who disclosed a process for dissolving such fibers from fabric blends leaving cellulosic fibers unattacked.

Lautenberger's procedure which is directed to the separation of the above-cited synthetic fibers in order to study the dyes on the unattacked cellulosic fibers in the blend, involves simple soaking of the blend in HFIP, rinsing in fresh HFIP and drying in the air.

More specifically Lautenberger recommends that a 2-inch square sample of the blended fabric be soaked for 30 minutes with occasional stirring in 50 ml. HFIP. Thereafter the fabric is soaked for 5 minutes in 50 ml. of fresh HFIP, removed and dried in the air.

The effect produced by HFIP is, in a sense, the opposite of the conventional so-called "burn out" process as described in American Association of Textile Chemists and Colorists Method 20–1963T in which sulfuric acid is used to remove cellulocic fibers by charring, leaving synthetic non-cellulosic fibers generally unattacked.

SUMMARY OF THE INVENTION

HFIP forms a series of maximum boiling point non-stoichiometric molecular complexes with primary, secondary and tertiary alkanols. Preferred primary, secondary and tertiary alkanols are those containing from one to four carbon atoms. The complexes distill unchanged at boiling points greater than those of either component and possess useful discriminate solubility properties for polymers which are different from the properties of the individual components.

DESCRIPTION OF THE INVENTION

The compositions of the invention are prepared by simple mixing of HFIP with an alkanol in the proportions shown in Table 1 below. Alternatively, the inventive compositions can be isolated by fractional distillation from mixtures of HFIP and any one of the alkanols of the invention in any proportions. The inventive compositions are isolated as the fractions of highest boiling point.

Complexes are formed with primary, secondary, and tertiary alkanols containing up to at least four carbon atoms. The ratio of HFIP to alkanol in the complex depends on the alkanol as shown in Table 1.

TABLE 1

Molecular Complexes of HFIP With Alkanols

| Alkanol | Mol. ratio; HFIP/Alkanol | Alkanol (Mol. 0/0) | Boiling Point (C°) |
|---|---|---|---|
| $CH_3OH$ | 0.79 | 56.0 | 82.4 |
| $CH_3CH_2OH$ | 0.63 | 61.2 | 90.6 |
| $CH_3CHOHCH_3$ | 0.60 | 62.4 | 94.5 |
| $(CH_3)_3COH$ | 0.64 | 60.8 | 95.9 |

It is apparent from the above-described properties of the inventive compositions that a novel kind of HFIP complex has been uncovered. For example, the complexes differ from the hydrogen bond donor/acceptor complexes of Middleton in that the ratios of HFIP to second components in the invention mixtures are never unity as is the ratio in Middleton's complexes. Unlike the Middleton complexes, at least one of the inventive complexes (methanol) is decomposed by water and, whereas the second components of Middleton's complexes are all known hydrogen bond acceptors, the alkanol second components of the instant invention are hydrogen bond donors. The known true azeotropes of HFIP are minimum boiling point azeotropes whereas the instant complexes boil at temperatures higher than either component, thus indicating the presence of undefined molecular aggregates in the vapor phase.

The solubility properties of the complexes of the invention are substantially different from the properties of pure HFIP. For example, among common polymers only methacrylates are readily soluble in all complexes of Table 1. Only the methanol complex dissolves polyamides to the extent of about 8 grams/100 g. of polymer solution. The $C_2$— to $C_4$— alkanol complexes dissolve the same polyamide to an extent less than 0.5 g./100 g. solution. On the other hand, the $C_3$— and $C_4$— alkanol complexes dissolve nonpolymeric materials such as hydrocarbon oil much more readily than does HFIP alone, the solubility for such materials increasing with the molecular weight of the alkanol.

The solubility properties of the complexes suggest a number of uses in which HFIP itself is not suitable. For example, the solubility of polyamides and the insolubility of polyesters in the methanol complex should permit the "burn out" of say nylon 66 from a fabric blend of, for example, nylon 66 and polyethyleneterephthalate, and/or polyacrylonitrile.

Pure HFIP is generally too aggressive as a solvent for practical cementing of nylon cloth by wetting the pieces of cloth with the solvent and pressing the edges together. The methanol complex is satisfactory in this use.

The ability of HFIP to dissolve large amounts of methacrylates is retained in all the complexes of Table 1. Since HFIP is considerably more expensive than are the alkanols, the materials costs of processes using the complexes is substantially reduced.

The HFIP of the methanol complex and polymer therein dissolved are conveniently recovered by "drowning" the solution in hot water, whereupon pure HFIP flashes off overhead and the polymer precipitates. The HFIP is recovered by condensation; the polymer normally by filtration.

The constant boiling point property of the complexes is useful in the preparation and recovery of the mixtures by distillation. The property is also useful in the deposition of polymer films on substrates by evaporation of polymer solutions because the solvent composition remains constant throughout the evaporation.

EXAMPLES

Example 1

This example demonstrates the existence of maximum boiling point complexes of HFIP with methanol, ethanol, 2-propanol, and 2-methyl-2-propanol.

The equipment consisted in a two-neck 250 ml. round bottom flask fitted with a calibrated addition funnel and a Liebig condenser with a "Drierite" filled drying tube. Standard taper joints were unlubricated and were fitted with polytetrafluoroethylene sleeves. Suspended in the condenser was a calibrated thermometer with its bulb in the vapor space of the flask. The assembled equipment was dried by purging with dry nitrogen.

100 ml. HFIP was placed in the flask and methanol was placed in the addition funnel. Methanol was added in increments to the flask. After each addition the flask contents were refluxed gently until the observed temperature was constant for ten minutes, when temperature and barometric pressure were recorded.

The experiment was repeated successively using ethanol, 2-propanol, and 2-methyl-2-propanol in place of methanol.

HFIP and alkanol volume data were converted to mole percent and observed boiling points were corrected to 760 mm. Hg. pressure. The converted results, for the composition regions near the maximum boiling points are shown in Table 2. From interpolation it is evident that the alkanols formed with HFIP the constant boiling point complexes shown in Table I.

TABLE 2

| $CH_3OH$ (mol. percent) | Boiling point (°C., 760 mm.) | $C_2H_5OH$ (mol. percent) | Boiling point (°C., 760 mm.) | $CH_3CHOHCH_3$ (mol. percent) | Boiling point (°C., 760 mm.) | $(CH_3)_3COH$ (mol. percent) | Boiling point (°C., 760 mm.) |
|---|---|---|---|---|---|---|---|
| 44.0 | 77.3 | 57.3 | 89.2 | 52.3 | 88.1 | 56.3 | 94.7 |
| 47.8 | 79.6 | 59.0 | 90.5 | 55.4 | 91.2 | 57.3 | 95.1 |
| 51.1 | 81.3 | 60.5 | 90.6 | 58.0 | 93.2 | 58.3 | 95.5 |
| 54.0 | 81.9 | 61.9 | 90.6 | 60.3 | 94.3 | 59.3 | 95.8 |
| 56.6 | 82.0 | 63.1 | 90.5 | 62.4 | 94.5 | 60.2 | 96.0 |
| 59.0 | 81.8 | 64.3 | 90.3 | 64.2 | 94.2 | 61.1 | 95.9 |
| 61.1 | 81.1 | 65.4 | 90.1 | 65.9 | 93.7 | 61.9 | 95.9 |
| 62.9 | 80.4 | 66.5 | 89.7 | 67.4 | 93.1 | 62.7 | 95.7 |
| 64.6 | 79.5 | 67.4 | 89.4 | 68.8 | 92.6 | 63.5 | 95.5 |

EXAMPLE 2

This example shows the solubility characteristics of the constant boiling point complexes of Table I for several polymers.

The procedure consisted in adding about 0.5 gram increments of candidate polymers to 100 ml. of refluxing and magnetically stirred constant boiling point complexes of the invention.

Solubilities reported in Table 3 correspond to the solubility calculated for the last increment to dissolve. Should the first increment fail to dissolve, the solubility is reported as being less than the solubility corresponding to solution of the increment.

The solubility of hydrocarbon oil was measured at 25°C. by adding the oil from a burette to the stirred inventive compositions until the solution first became cloudy.

The results are shown in Table 3.

TABLE 3.—ALKANOL

| | Solubility in grams/100 g. total solution | | | |
|---|---|---|---|---|
| Solute | $CH_3OH$ | $CH_3CH_2OH$ | $CH_3CHOHCH_3$ | $(CH_3)_3COH$ |
| Polyamide [1] | 8.0 | <0.5 | <0.5 | <0.5 |
| Polyester [2] | <0.4 | <0.5 | <0.5 | <0.5 |
| Polyacrylonitrile [3] | <0.4 | <0.5 | <0.5 | <0.5 |
| Polyacetal [4] | <0.4 | <0.5 | <0.5 | <0.5 |
| Polymethacrylate [5] | >21.0 | >21.0 | >21.0 | >21.0 |
| Hydrocarbon oil [6] | <0.05 | <0.06 | 2.0 | 2.7 |

[1] "Zytel" 100 poly(hexamethylenediamine adipate) (E. I. du Pont de Nemours and Co., Inc.).
[2] "Dacron" polyethylene terephthalate (E. I. du Pont de Nemours and Co., Inc.).
[3] "Orlon" A polyacrylonitrile (E. I. du Pont de Nemours and Co., Inc.).
[4] "Delrin" acetal resin (E. I. du Pont de Nemours and Co., Inc.).
[5] "Elvacite" 2046 poly n-butyl, isobutyl (1=1 mol.) methacrylate (E. I. du Pont de Nemours and Co., Inc.). Ultimate solubility was not reached. Solution became too viscous to stir.
[6] "Suniso" 3 G refrigerator oil, Sun Oil Company.

I claim:

1. A maximum boiling point complex consisting of 1,1,1,3,3,3-hexafluoro-2-propanol and an alkanol selected from the group consisting of primary, secondary and tertiary alkanols containing from one to four carbon atoms.

2. The complex of claim 1 in which the alkanol is methanol which comprises about 56 mole percent of the azeotrope and the boiling point is about 82°C.

3. The complex of claim 1 in which the alkanol is ethanol which comprises about 61 mole percent of the azeotrope and the boiling point is about 91°C.

4. The complex of claim 1 in which the alkanol is 2-propanol which comprises about 62 mole percent of the azeotrope and the boiling point is about 95°C.

5. The complex of claim 1 in which the alkanol is 2-methyl-2-propanol which comprises about 61 mole percent of the azeotrope and the boiling point is about 96°C.

* * * * *